Patented Oct. 7, 1941

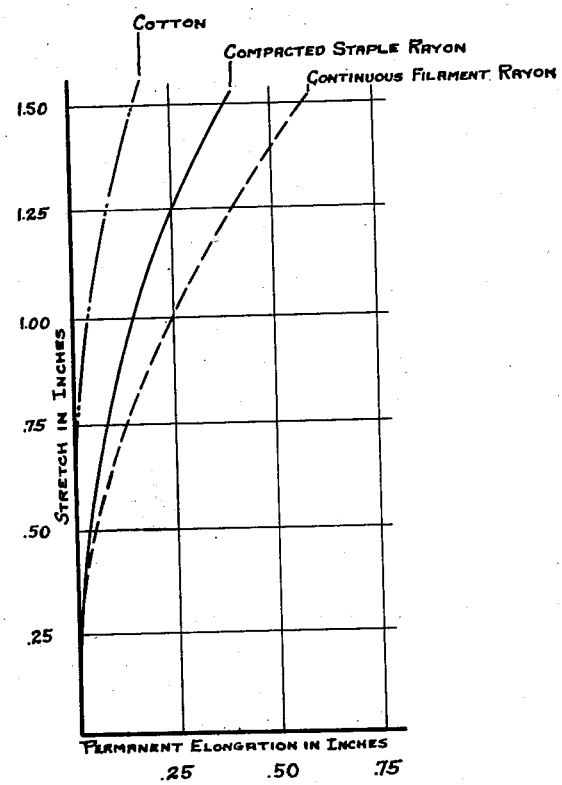

2,258,179

UNITED STATES PATENT OFFICE

2,258,179

TIRE CORD AND METHOD OF MAKING SAME

Albert W. Hansen, West Springfield, Mass., assignor, by mesne assignments, to United States Rubber Company, New York, N. Y., a corporation of New Jersey Application December 16, 1937, Serial No. 180,199

3 Claims. (Cl. 57—140)

This invention relates to a cord construction for use in the manufacture of pneumatic tires and more particularly to a tire cord constructed from rayon and similar materials.

Cotton is the most generally used material in constructing cords for tire manufacture, but with the high speeds and heavy loads now commonly encountered in truck and bus service, where large size tires are required, the inability of cotton to withstand the high temperatures generated in such service has caused the art to turn to other materials more resistant to high temperatures. Rayon was early recognized to possess the desired qualities of heat resistance, but other characteristics have militated against its use, particularly its ductility or extensibility. With the introduction of a rayon filament having greater resistance to stretch, sometimes referred to as high tenacity rayon, further attempts were made to utilize rayon in tire cords. One proposed cord construction using high tenacity rayon is that disclosed in the patent to Dinsmore 2,058,778, issued October 27, 1936.

While the so-called high tenacity rayon has sufficient tensile strength for tire construction purposes, and its strength is only slightly, if at all, impaired at the high temperatures generated in high speed truck and bus service, it lacks desirable elasticity; that is, its elongation tends to become permanent with the result that in use tires constructed with such rayon in accordance with accepted practice may tend to "grow". Where the cord is constructed from filament rayon which is the present accepted practice, it is necessary to use very low single twist since, with rayon filament yarns the tensile strength of the yarn decreases as the single twist goes up. Furthermore, with present practice it is necessary to treat the rayon cords with adhesive in order to secure satisfactory bonding of the cords to the rubber, a proceeding which adds materially to the cost.

Among the objects of my invention are to provide a tire cord formed of rayon in which the inherent tendency of rayon toward excessive and permanent elongation is avoided or compensated for, in which the necessity of adhesive treatment of the cord is avoided, and by which a more useful and less expensive rayon cord is made available for tire construction.

The accompanying drawing illustrates the advantage, from the standpoint of hysteresis, of my construction.

According to my invention I prepare a high tenacity rayon in staple form. A staple length of the order of 1¼" to 1½" is preferable. I also find it advantageous to use fibers of small size—1.0 to 1.5 denier have proved suitable but even lower deniers are preferable if available. The smaller deniers provide better bonding with the rubber and have the further advantage of higher grams per denier tensile. By employing a staple construction the adhesive treatment necessary to secure adhesion of filament rayon cords to the rubber is avoided. I am aware that staple rayon yarns have been used in making textile fabrics and have been proposed for use in tire cords. Previous attempts to employ staple yarns in tire cords have not, however, met with success. Experience has shown that the tendency of the twisted fibers to slip and pull out when subjected to strain, is greater with rayon than with cotton and this results in still further excessive and permanent elongation of the cord which is added to the inherent tendency of the rayon fiber to permanently elongate. The percentage of stretch of such rayon cords was prohibitively high as far as use in tires was concerned, and the tensile too low to be satisfactory. I have found, however, that if the staple rayon yarn is twisted under high tension either when twisting the yarn into strands or the strands into cords, or both, thus decreasing the capacity of the cord for subsequent elongation, the stretch characteristics of the cord may be brought within the range satisfactory for tire use. A high degree of twist may be employed with advantage. The tensile strength is also substantially increased since the fibers are more completely bound together. The twisting practice which I employ in constructing my cord does not require special apparatus for the purpose, the equipment employed in preparing cotton cords in accordance with the disclosure of the Brownell Patent 2,075,777, issued March 30, 1937, being satisfactory for my purpose.

The effect of the excessive strand and/or cable twist given to the high tenacity rayon yarns in combination with the stretching of the strands and/or cords is to permanently elongate the cord through a drawing out of the fibers and also to permanently elongate the cord through a decrease in the turns per inch of twist. The latter effect is accompanied by a tightening of the cord structure which removes from the cord the capacity for an excessive objectionable degree of elongation from slippage of the fibers and strands which normally characterizes staple rayon cord. The compacting of the fibers may be accomplished after the cord is completed by stretching the cord and holding it stretched until the fibers "set" in their compacted condition before final packaging of the cords. Tension twisting and subsequent stretching may be used in combination. In any event the degree of twist imparted at the several twisting operations is sufficiently in excess of that desired in the finished cord to compensate for the twist removed in the stretching operation.

The staple rayon cord thus produced more closely approximates a cotton cord from the standpoint of hysteresis, or its ability to return more nearly to its original length when the load is removed. This quality is indicated in the diagram of the drawing. I also obtain the added advantages that with a staple construction very much wider ranges of cord constructions and cord sizes are obtainable through choice of twists and degrees of tension applied during the manufacture of the cord. Furthermore, my construction is much more economical since the expense of adhesive treatment of the cord is eliminated and for a given size of yarn a staple yarn is less expensive in the cost of material than a continuous filament yarn.

While my invention is in no sense limited to a particular type of rayon, cuprammonium fiber, because of its lower extensibility, in both dry and wet condition, as compared with viscose, has advantages, and it possesses the further advantage that it can be produced in smaller deniers.

In some cases it is advantageous to mix cotton or other fibers with the rayon staple and it will be understood that my invention includes the use of such mixtures where the proportion of rayon fiber is sufficient to characterize the yarn.

What I claim is:

1. The method of making a cord for use in a pneumatic tire casing which comprises twisting together a plurality of yarns spun from high tenacity staple rayon to form strands, stretching the strands to effect a permanent elongation thereof and a compacting of the fibers, twisting a plurality of such strands together to form a cord and stretching the cord to effect a further permanent elongation thereof and a further compacting of the fibers, the degree of twist imparted at the several twisting operations being sufficiently in excess of that desired in the finished cord to compensate for the twist removed in the stretching operations.

2. A cord for use in pneumatic tire casings and the like which comprises a plurality of strands formed of twisted high tenacity staple rayon yarns, the fibers of the yarns and strands being compacted together, the degree of compactness being such that the cord has substantially the stress strain characteristics of rayon, and a recovery after stretching approximating that of cotton.

3. A cord for use in pnuematic tire casings and the like which comprises a plurality of strands formed from twisted high tenacity staple rayon yarns, the fibers of the yarn and strands being compacted together to reduce slippage between the fibers sufficiently so that the cord has substantially the stress strain characteristics of rayon, said cord having a recovery after stretching approximating that of cotton.

ALBERT W. HANSEN.